United States Patent
Tse et al.

(10) Patent No.: US 7,352,490 B1
(45) Date of Patent: Apr. 1, 2008

(54) METHOD AND SYSTEM FOR GENERATING CONTONE ENCODED BINARY PRINT DATA STREAMS

(75) Inventors: Francis Kapo Tse, Rochester, NY (US); Ramesh Nagarajan, Pittsford, NY (US); James P. Russell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 11/531,572

(22) Filed: Sep. 13, 2006

(51) Int. Cl.
*B41B 1/00* (2006.01)
*H04N 1/405* (2006.01)
*H04N 1/403* (2006.01)
*H04N 1/409* (2006.01)
*H04N 1/387* (2006.01)
*H04N 1/40* (2006.01)
*H04N 1/46* (2006.01)
*G06K 9/34* (2006.01)

(52) U.S. Cl. ............ 358/1.9; 358/2.1; 358/2.99; 358/3.15; 358/3.27; 358/453; 358/462; 358/538; 382/171

(58) Field of Classification Search ........... 358/1.9
See application file for complete search history.

(56) References Cited

U.S. PATENT DOCUMENTS

| | | | |
|---|---|---|---|
| 5,293,430 A | 3/1994 | Shiau et al. | |
| 5,617,216 A * | 4/1997 | Wada | 358/2.1 |
| 5,850,474 A | 12/1998 | Fan et al. | |
| 5,959,290 A | 9/1999 | Schweid et al. | |
| 6,020,979 A * | 2/2000 | Zeck et al. | 358/1.9 |
| 6,130,966 A | 10/2000 | Sekine et al. | |
| 6,240,205 B1 | 5/2001 | Fan et al. | |
| 6,275,303 B1 * | 8/2001 | Fukaya | 358/13 |
| 6,343,159 B1 | 1/2002 | Cuciurean-Zapan et al. | |
| 6,594,401 B1 | 7/2003 | Metcalfe et al. | |
| 7,043,080 B1 * | 5/2006 | Dolan | 382/199 |
| 2002/0196467 A1 * | 12/2002 | Delhoune et al. | 358/1.18 |
| 2004/0066538 A1 * | 4/2004 | Rozzi | 358/2.1 |
| 2005/0163374 A1 * | 7/2005 | Ferman et al. | 382/176 |
| 2005/0206948 A1 * | 9/2005 | Uejo | 358/1.15 |
| 2006/0132850 A1 * | 6/2006 | Banton et al. | 358/3.27 |

* cited by examiner

*Primary Examiner*—Vu Le
*Assistant Examiner*—Mesfin Getaneh
(74) *Attorney, Agent, or Firm*—Basch & Nickerson LLP; Michael J. Nickerson

(57) ABSTRACT

A method and system to convert an electronic image file described in a page description language containing both contone and non-contone image objects to an intermediate binary format image. The intermediate format image separately encodes the contone and non-contone image objects. The contone image objects are edge-tagged. Prior to printing, the intermediate binary format page image is separated into the contone and non-contone image objects. The contone image objects are converted back to a contone form using the edge tagging to modify the filter weights of a digital filter. The non-contone image objects are converted to contone form by means of a pattern matching scheme.

14 Claims, 15 Drawing Sheets

| 0 | 1 | 2 | 3 |
|---|---|---|---|
| 1 | 2 | 4 | 8 |
| 4 | 5 | 6 | 7 |
| 16 | 32 | 64 | 128 |
| 8 | 9 | 10 | 11 |
| 256 | 512 | 1024 | 2048 |
| 12 | 13 | 14 | 15 |
| 4096 | 8192 | 16384 | 32768 |

401 — PATTERN KERNEL

| 0 | 1 | 0 | 1 |
|---|---|---|---|
| 1 | 0 | 1 | 0 |
| 0 | 1 | 0 | 1 |
| 1 | 0 | 1 | 0 |

501 — PORTION OF BINARY IMAGE

*FIG. 5*

METHOD AND SYSTEM FOR GENERATING CONTONE ENCODED BINARY PRINT DATA STREAMS

BACKGROUND AND SUMMARY

Digital multifunction reprographic systems are well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit which may re-order or reorganize these pages and then, depending on the request of the user of the device, send the pages or images to a destination. Often this destination is an attached printing unit which makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (PDLs) to the native format of the printing device.

An important inner component of such a conventional multifunction digital device is the image path. This is the combination of software and hardware elements that accepts the electronic images from a multiplicity of sources and performs any operations needed to convert the images to the format desired for the various output paths. The image path is usually one of the more complex and costly components of such digital multifunction devices.

The image path for a conventional multifunction device usually has several constraints. On one hand, there is a desire to make the image path utilize data in a multi-bit per pixel format so as to provide for maximum image quality and a minimum loss of critical information in the transformation of documents from paper to electronic form. On the other hand, there are cost constraints and performance limits on the devices or software that comprise the image path.

Conventional image path electronics may also utilize binary image paths. In this situation, if the input information is scanned in a binary manner at sufficiently high resolution, the scanned image can be reconstructed at the output with little or no perceptible loss of image quality.

Another component of many conventional multifunction devices, especially for those devices having a printing engine that is capable of producing colored output, is the use of analog modulation schemes for the output. In these devices, analog data, in the form of multi-bit pixels, is presented to the modulator of the output printing device. The modulator compares the analog equivalent of the input byte of data to a periodic saw tooth wave. The output therefrom is a signal to the laser imaging component that is pulsewidth modulated by the data stream.

One recent development for conventional multifunction reprographic machines is the use of both binary and analog data in the image path. In such a hybrid image path, the data from the scanner is digitized and converted to binary. All of the intermediate elements of the image path are designed to work with the compact binary data format. Only at the output is the data converted back to multi-bit analog e.g. contone, form.

One way to implement the resolution conversion is to pass the binary data through the digital equivalent of a two-dimensional low pass filter. The low pass filter may replace each pixel in the binary image by the average of the values within some window centered on the pixel of interest. While such a system does an adequate job of converting the high resolution binary data to analog data, these solutions also have the deleterious effect of smearing sharp edges in the original document. Such an effect is particularly detrimental when reproducing text and line art.

A desirable modification to hybrid image paths would be a system wherein the conversion from binary format to analog format could take into account the existence of sharp edges in the image. Ideally such a scheme would be adaptive, that is, it would change its behavior so that it would apply a resolution conversion scheme appropriate to sharp edges for those parts of the image that have such edges, but use a different scheme that was better adapted to more continuous tone parts of the image.

Systems that implement resolution conversion processes, like those outlined above, show significant improvement in image quality compared to systems that do not implement resolution conversion processes. However, such systems are subject to problems. One such problem is the need to somehow distinguish those parts of the image that have edges from those parts of the image that do not. Various processes have been proposed to identify such regions and to develop an image parallel to that being reproduced, a tag image, that identifies those parts of the image that are edges.

All of the above processes deal with the copying process wherein a physical original is presented to the system and the scanner part of the system performs some processing on the digital image of the scanned original to generate the tag information. However, modern multifunction systems are also expected to function as digital printers, accepting input, usually in the form of a page description language format of the document to be printed. There is a component of such systems that converts the page description language form of the document into a form that can be processed by the image path and printing section of the multifunction machine.

If the page description language conversion process generates an analog image directly, any documents to be printed make heavy demands on the intermediate storage parts of the image path. Furthermore, the injection of such an image into the print path may be incompatible with the design of the copy image path which is designed to handle binary encoded image. This incompatibility is undesirable from a cost and performance standpoint. An alternative is to generate the images from the page description language as binary images. This makes the images from the page description language compatible with the copy path, but leaves a problem in that the images from the page description language are not tagged.

However, the page description language "knows" the exact location of any edges, whenever the edges are associated with text or graphics. It would therefore be desirable if the page description language decomposition process could generate edge tags that would be compatible with those tags generated in the copy/scanning process so that images from the page description language would have the same high level of image quality as does the copy path.

However, the page to be printed often contains embedded contone image objects. While the page description language processor has means to process these embedded contone objects, it does not normally contain any means for identifying any sharp edges in these contone image objects and therefore any benefit of edge sharpening cannot be applied to these objects.

One limitation of such a system is that the page description language processor is that it cannot identify the presence of edges if there are image files embedded in the page description language.

Thus it would be desirable to expand the edge detection to include any embedded images as well as the text and graphic components of the page.

BRIEF DESCRIPTION OF THE DRAWING

The drawings are only for purposes of illustrating various embodiments and are not to be construed as limiting, wherein:

FIG. 5 shows how the 4×4 matrix from FIG. 4 is used to generate a unique pattern identifier;

DETAILED DESCRIPTION

Figure 1:
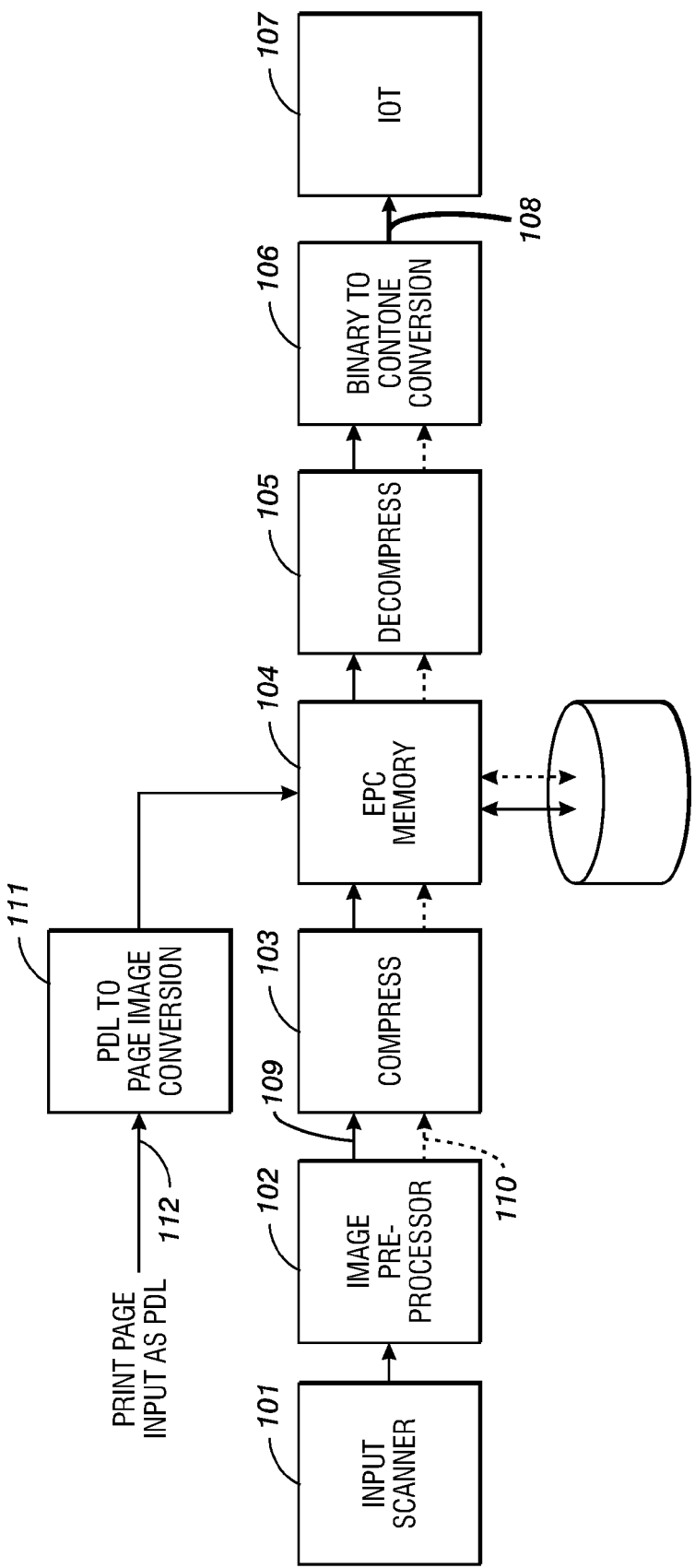
FIG. 1 illustrates the schematic flow of the image path for a multifunction reprographic machine.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates, in schematic form, the general image path of a full multifunction reprographic system. The image path is a combination of hardware and software elements that generate, process, and store the digital page images that are being processed by the system. A control system (not shown) configures each element of the image path depending on the user job. The control system also schedules the various jobs and functions of the entire system.

As illustrated in FIG. 1, a digital scanner 101 accepts a hardcopy version of the page or pages to be copied and converts each page to a digital image, in contone form, at some moderately high resolution. The digital scanner 101 may include electronic elements that initially process the image, correcting, if needed, for any optical or illumination defects in the scanner 101.

The digital page image is then passed to a preprocessor 102 that performs further manipulations of the page image, such as editing, or tone curve correction. The preprocessor 102 converts the contone image from the scanner 101 to a binary image 109. The preprocessor 102 also can form a tag image 110. This tag image 110 can identify, at a pixel level, various characteristics of the underlying binary image. For example, the tag image 110 can indicate whether a pixel in the binary image is part of a sharp edge or not. Further details of the tag image will be described below.

After the preprocessing, the binary and tag images are passed through a compression circuit 103 which losslessly compresses the binary and tag images to a smaller size. The compressed images are then passed to a Electronic Precollation (EPC) memory 104. The memory 104 stores each binary image in a page format and its associated tag image in a page format. The memory 104 also keeps track of all the relevant sets of images that comprise the document being copied. The memory 104 can be used for many purposes, including for example, the ability to print multiple copies of an input document with a single scan. There are many other functions of the memory 104 that are well known to those skilled in the art.

When pages of a document are ready to be printed, the pages are extracted from the memory 104 and sent to a decompression circuit 105. The decompression circuit 105 restores the compressed images to full size. The decompressed binary image and its associated tag image are then passed to a binary to contone converter 106, which converts the binary image into a full contone image 108 that is in the proper format to drive the output printer (IOT) 107. As will be discussed below, the binary to contone converter may use the tag image to help convert the binary image to a high quality print format image.

If the job to be reproduced is a print job, that is the job starts in electronic form; the input to the reprographic system is via the print data path 112. The job is assumed to be transmitted to the reprographic machine via some external communication channel.

The control system in turn passes the print data stream, which is in the form of a page description language; for example Postscript; to an image converter 111. The image converter 111 may be implemented as a software program on a general purpose microprocessor, in hardware, or in firmware. The image converter 111 converts the page description language document into a set of images that are in a binary format, identical to the binary image format used by the copy path. These images may be in a page format. The binary images are passed to the memory 104 for storage until ready to print.

If the reprographic system is a full color system, printing images in a full range of colors, the image path is logically the same, although there is additional processing to handle the extra information needed to convey the color aspects of the image. In particular in a color system, the red, green and blue (RGB) image format from the scanner is converted into an internal format; for example L*a*b* or some similar variant. Alternatively, the input RGB can be converted in the preprocessor stage to the CMYK colors needed at the output. In either case the logical processing of the page images is still the same; a separation for each dimension of the color space being processed is generated for each page image.

Figure 2:
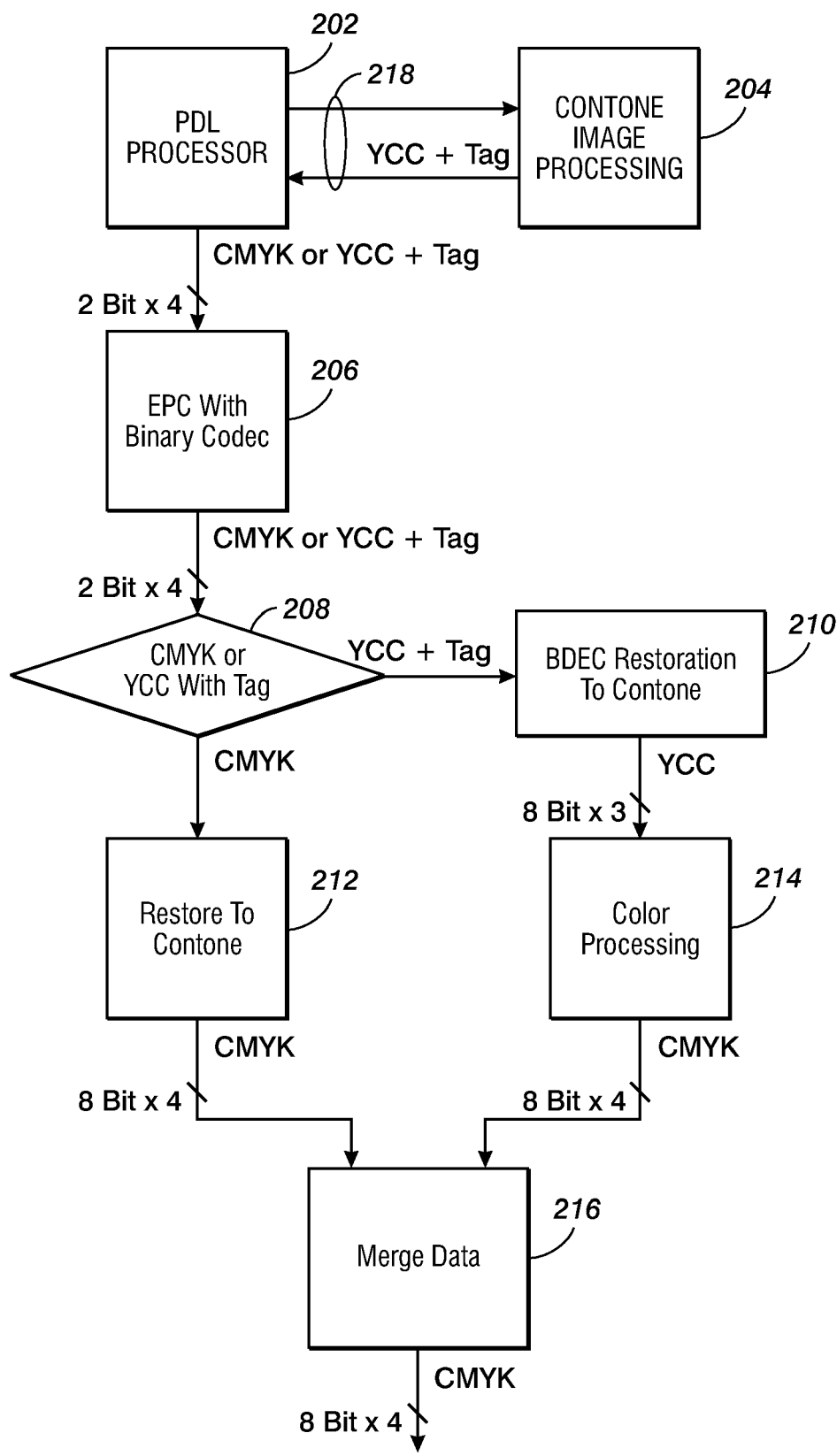
FIG. 2 illustrates a method for separately processing embedded contone image objects in a page description language stream.

However, as noted above, in conventional systems, the print data stream is not tagged so that any information about edges is lost. To prevent the loss of edge data, FIG. 2 illustrates an example of a flowchart of a process for performing edge-tagging of contone image objects. A Page Description Language processor 202 performs a conventional decomposition of the page description language into a binary bitmap for all objects except embedded contone objects, e.g. images. The embedded contone image objects are sent, via an external interface 218, to a module 204 that processes the embedded contone image objects.

The module 204 identifies and tags edges, transforms the color space from an input color space to a three component luminance-chrominance color space, and binarizes the image. The three component luminance-chrominance color space may preferably be a YCC color space. The processed image is returned to the Page Description Language processor 202 as an image containing four planes: one plane for each component of YCC and the fourth plane for the tags wherein the tags identify edges.

The module 204 may be implemented as a software program running on the same processor that performs the page description language decomposition, or the module 204 may be implemented as an external hardware module.

As noted above, the binarized contone image object is returned to the Page Description Language processor 202, where the binarized contone image object is merged with the rest of the binarized image. The data stream from the objects that are not contone image objects are also in a four plane space, one each for CMYK.

The combined binary image is sent to an electronic precollation memory 206. This memory 206 is used for a number of purposes, for example printing multiple copies of a document without having to re-process the page description language each time.

When it is time to print the image, the image is retrieved from the memory 206 and sent to a separator module 208. The separator module 208 separates the contone binary image from rest of the binary image. This separation is needed because the edge preservation of the contone binary image is different from the rest of the binary image thus requiring separate methods of reconstructing a contone image from the binary image.

In order to separate the two kinds of content in the binarized image, a two bit tag plane is utilized wherein the two bits encode not only the binary state of each pixel, but also identifies whether the pixel is originally from a contone image object or not.

An example of a two bit plane provides for contone image objects being tagged so that a binary "0" pixel is encoded as the two bits "10," and a binary "1" pixel is encoded as the two bits "01." The non-contone image object objects are tagged so that a binary "0" pixel is encoded as "00," and a binary "1" pixel is encoded as "11." Therefore, when the binary image reaches the separator module 212 the two image classes can easily be separated. The separator module 212 determines which class of object each pixel belongs to by examining the encoding of the pixels in the first three (CMY or YCC) planes of the image. The fourth plane is different between the two classes of images. For the original contone image objects, it is an edge tagging plane. While for the original non-contone image objects, it is the K plane of a CMYK space.

The binary image representing the original contone image objects are converted back to a contone image using a BDEC-like restoration process in module 210. An example of a BDEC-like restoration process is described in co-pending U.S. patent application Ser. No. 11/268,147, entitled "Method and System for Generating Contone Encoded Binary Print Data Streams" filed on Nov. 7, 2005. The entire content of U.S. patent application Ser. No. 11/268,147 is hereby incorporated by reference. After contone conversion, the contone YCC image is further color processed to convert it to a native CMYK color space of the printer in module 214.

The binary image representing the non-contone image objects is converted to a contone image by a pattern-recognition based reconstruction module 212. An example of a pattern-recognition based reconstruction process is described in co-pending U.S. patent application Ser. No. 11/281,267, entitled "Method and System for Improved Copy Quality in a Multifunction Reprographic System" filed on Nov. 17, 2005. The entire content of U.S. patent application Ser. No. 11/281,267 is hereby incorporated by reference. The output of pattern-recognition based reconstruction module 212 is a full CMYK, 8 bit per pixel, contone image which has preserved edge acuity.

The two data streams are merged together in a merge module 216 that combines the two contone CMYK data streams into a single contone CMYK page image that is sent to the printer.

The process for reconstructing a contone image performed in module 212 assumes that the binary image is not tagged specifically as to which pixels are associated with edges. Therefore, reconstruction of a contone image from the binary image using pattern recognition methods for the reconstruction preserves edge acuity.

To realize binary to contone conversion, the pattern of pixels in the neighborhood of the pixel being converted is examined. An example of a pattern identifier process is disclosed in U.S. Pat. No. 6,343,159. The entire content of U.S. Pat. No. 6,343,159 is hereby incorporated by reference.

Once the pattern is identified, a pattern identifier dataword is forwarded to a look-up table, wherein the look-up table is capable of converting the pattern identifier dataword to a contone value.

Figure 3:
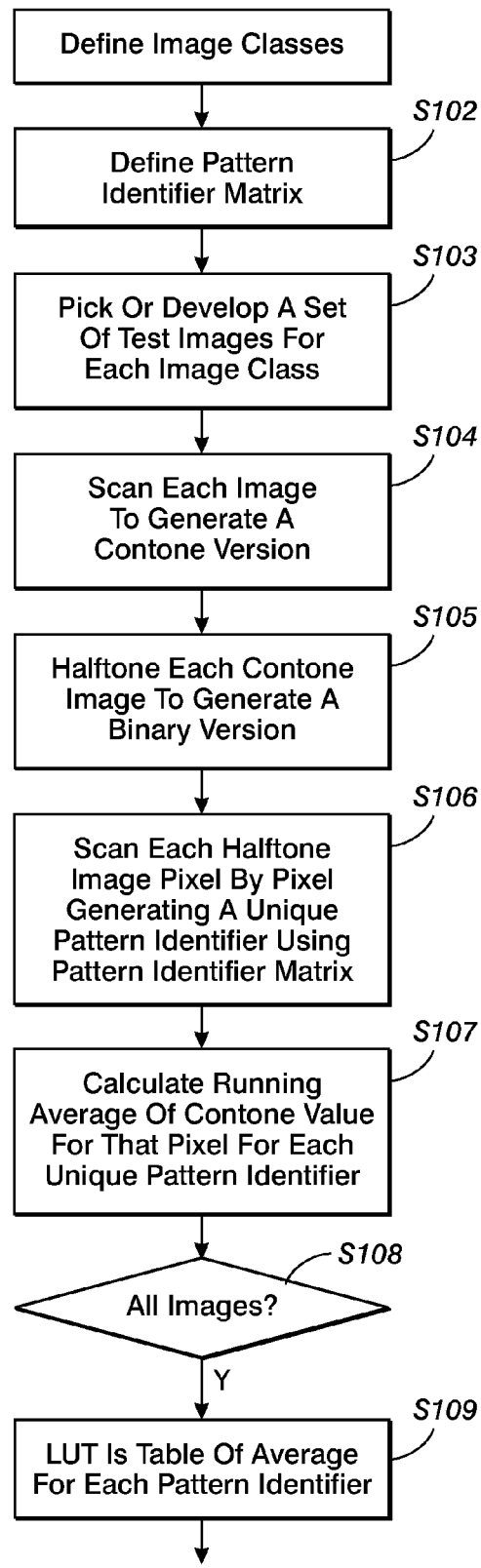
FIG. 3 illustrates a method for generating a set of lookup tables for reconstructing a contone image from a binary image.

FIG. 3 illustrates a flowchart for creating the values for the look-up table. At step S102, a pattern identification matrix is chosen. The pattern identification matrix is a small rectangular window around each pixel that is used to identify the pattern of pixels around the pixel of interest. In the following discussion, the height and width of the window are N and M, respectively.

For encoding, the size of the look-up table is $2^{N*M}$; i.e., a 4×4 pattern identification matrix window generates a look-up table that is 65536 elements long. For each image, a pattern kernel is centered on the pixel of interest and a pattern identifier is generated. The process of generating the pattern identifier will be described in more detail below.

A large set of test documents is assembled at step S103. The test document set may be composed of portions of actual images and synthetically generated images that are representative of the image content likely to be encountered. The document class representing text and line art would include a large variety of text in terms of fonts and sizes as well as non-Western character sets e.g. Japanese and Chinese.

In the next phase of the calibration process, at step S104, each of these test documents is scanned using a scanner. The output of this scan is the contone version of the document. This contone image is now further processed, at step S105, with a halftone. The result of the process of step S105 is a binary version of the same document image. Therefore, when completed, the calibration process generates two images per document: a contone image and a binary image.

Each halftone image is scanned, pixel by pixel, at step S106, and for each pixel, a pattern identifier is generated. The same process of generation is used during calibration and reconstruction. Each element of the pattern kernel is identified with a power of 2 starting with $2^0=1$ and going to $2^{(N*M-1)}$. There is no unique way of matching each element of the kernel with a power of 2; the pattern can be chosen at random; as long as the same matching is used for the calibration and reconstruction. However, it is easier to have some simple ordering of the matching, say from upper left to lower right going across the rows.

Figure 4:
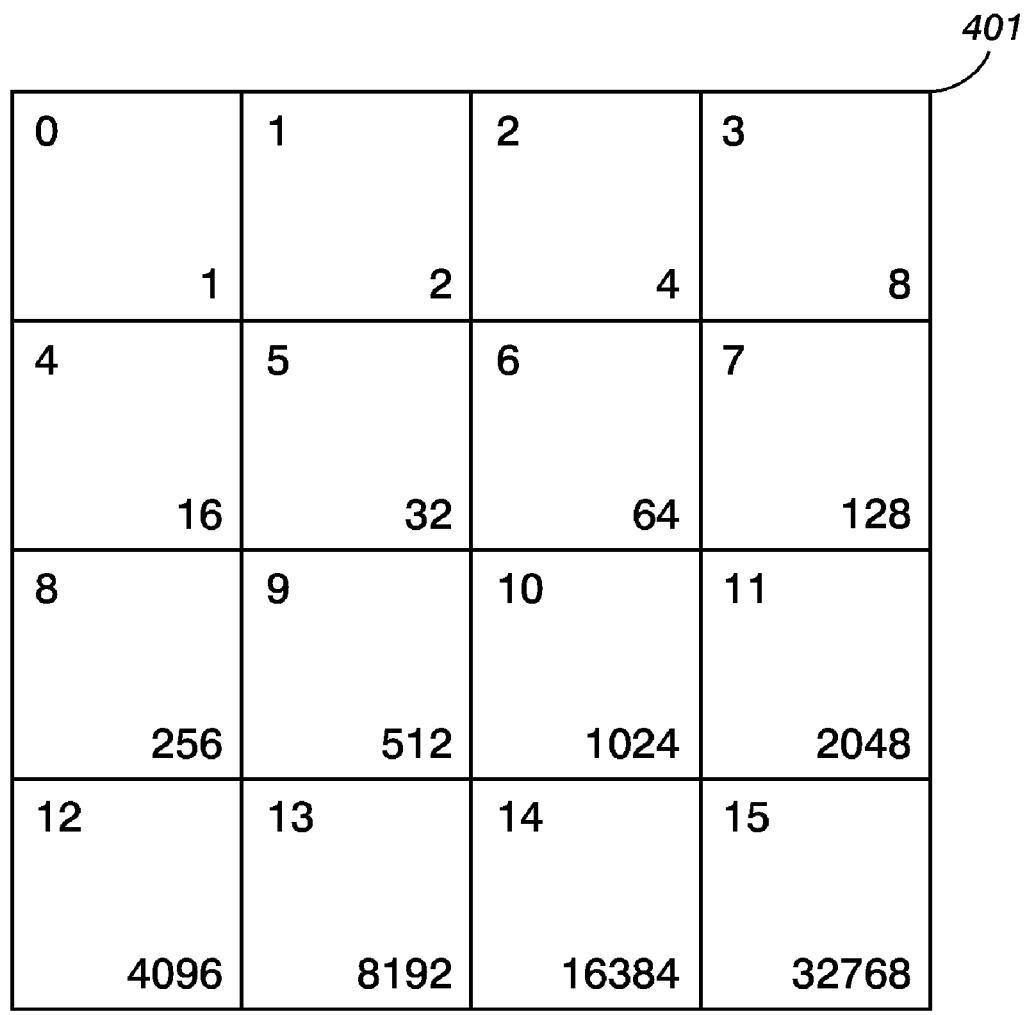
FIG. 4 illustrates a 4×4 pattern generation kernel matrix.

FIG. 4 shows an example of a matching scheme for a 4×4 kernel 401. In each element of the kernel, the upper left hand number is a simple index into that element, while the lower right number is the power of 2 associated with the element. In this example, the weight of element of index i is given by $W_i=2^i$.

The pattern kernel is applied to each pixel in the binary image and a pattern identifier is generated by developing a N*M bit binary number where the 1s and 0s of the binary number are determined by the image pixel underlying the corresponding pattern kernel element. For those elements of the kernel where the corresponding pixel in the binary image is a 1, a 1 is entered into the corresponding power of 2 in the binary representation of the pattern identifier, and where the pixel is 0, a 0 is entered into the identifier. That is the pattern identifier is generated according to the equation:

Identifier=$\Sigma w_i * p_i$ where $w_i$ is the weight for the pattern kernel element, and $p_i$ is the corresponding image pixel value (0 or 1).

FIG. 5 shows an example for a part of an image with the 4×4 kernel applied. Using the pattern kernel 401 and the image portion 501, the pattern identifier for this pattern is given by the binary number: 0101101001011010 or decimal 23130.

Using the pattern identifier, the value of the pixel in the contone image that corresponds to the pixel in the center of the pattern kernel is selected. Using this value, the calibration program keeps a running average value of the contone value for all the pixels with the same pattern identifier, at step S107. As noted above, for a 4×4 window, there are potentially 65536 different pattern identifiers.

The process continues for all images in this way, a table of the average value of the contone pixels for each unique pattern identifier has been created. This average value will be the entry in the look-up table for the reconstruction process. Once all the images are processed, the look-up table is simply a 65536 byte table whose entries are the average contone pixel value for each pattern identifier, at step S108.

The full details of this restoration process are disclosed in co-pending U.S. patent application Ser. No. 11/281,267, entitled "Method and System for Improved Copy Quality in a Multifunction Reprographic System" filed on Nov. 17, 2005. The entire content of U.S. patent application Ser. No. 11/281,267 is hereby incorporated by reference.

Figure 6:
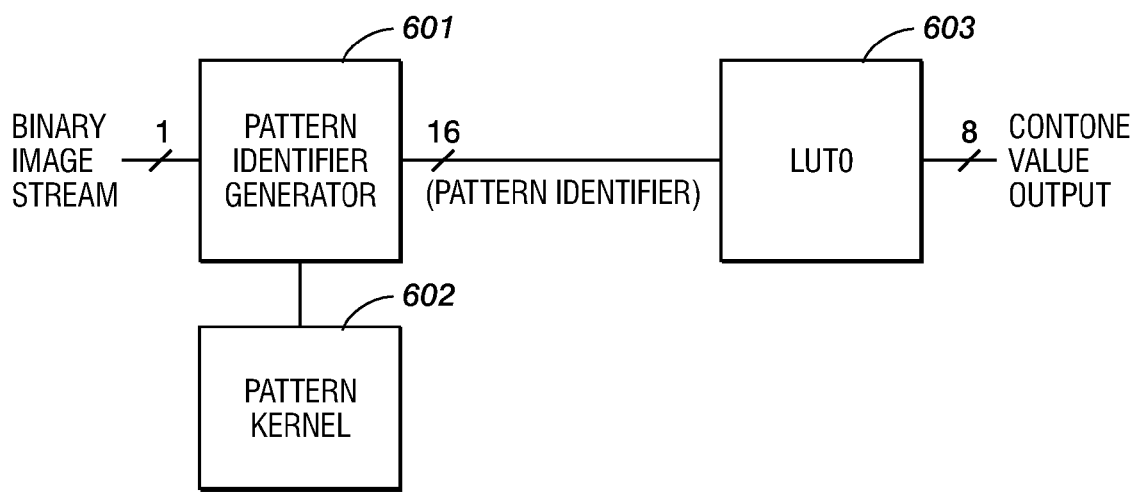
FIG. 6 shows a circuit that generates a reconstructed contone version of a tagged binary image.

As discussed above, each image pixel is input to the binary to contone reconstruction element of the image path along with its corresponding tag bits. The binary to contone element keeps a memory of a few scanlines and uses the scanlines to reconstruct, for each pixel, the pattern identifier using the same process as was used in the above-described calibration process. This pattern identifier is the address for the look-up tables, and the tag bits are used to choose which look-up table is actually used for generating the output. FIG. 6 shows schematically a system that carries out the binary to contone reconstruction.

In FIG. 6, the binary image data stream is input to a pattern identifier circuit 601 that computes the pattern identifier, using the pattern kernel 602. The pattern kernel is the same kernel that was used to generate the lookup tables. The output of the pattern identifier circuit 601 is a N*M bit number that is input to the look-up table 603. This N*M bit number is the pattern identifier for the pixel under evaluation. The lookup table is the table generated during the calibration process shown in FIG. 3, and so the output is the contone value that was found to best represent this particular pattern identifier during the calibration process. The look-up table can be implemented as a simple memory chip or equivalent circuit elements, or the look-up tables may be part of a larger ASIC or similar complex programmable device. The look-up tables may be hard coded, permanently programmed for example as ROM memory, or the look-up tables may be programmable to allow for changes.

For the reconstruction of the contone image objects on the page, we can use a different reconstruction method. Since the contone image objects contain a tag plane, we can use a reconstruction method that utilizes this tag information. The tag information can be generated by a variety of methods including, for example, matching some region of the image against a set of patterns that are indicative of sharp density edges in the original, or alternatively by applying some sort of digital filter which is more sensitive to high frequency information in the original object.

For example, U.S. Pat. No. 6,130,966 describes an implementation of this tagging process. The entire content of U.S. Pat. No. 6,130,966 is hereby incorporated by reference.

In a non-tagged process of reconstructing an analog image from a binary image, the binary image is filtered using a matrix of pixels centered on the pixel being reconstructed. The values in this matrix are chosen to provide a digital filtering function when the pixels of the image are convoluted with the filter matrix.

An example of an equation governing a non-tagged process of reconstructing an analog image from a binary image is:

$$t_x = \sum_i \sum_j x_{ij} * f_{ij}$$

where $t_x$ is the output pixel, $x_{ij}$ is the input binary pixel at location (i,j) relative to the pixel under test, $f_{ij}$ are the filter weights, and the summation is over all the pixels in the filter window.

Figure 7:
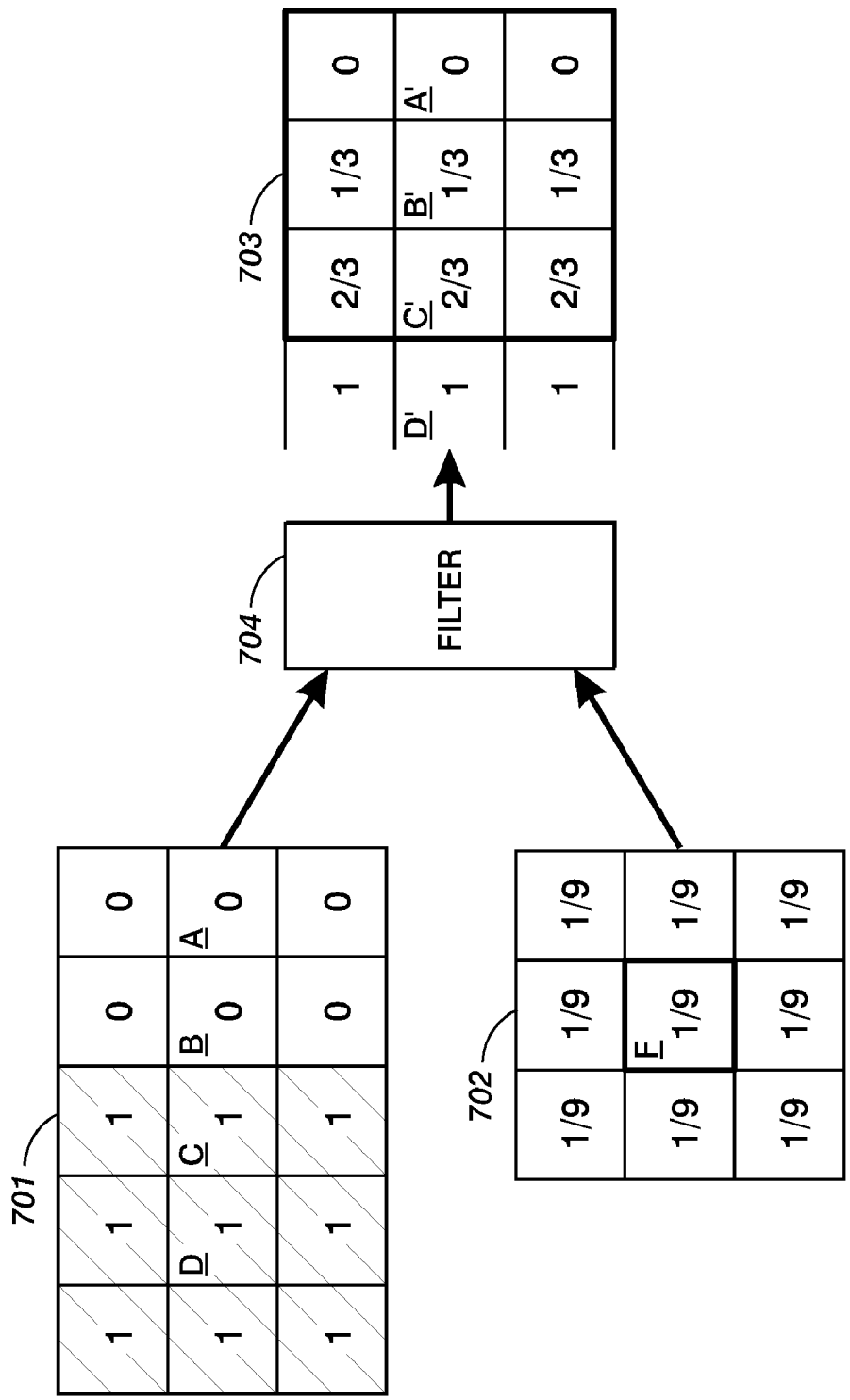
FIG. 7 illustrates a graphical representation of a digital filtering reconstruction of a multi-valued image from a binary image.

FIG. 7 illustrates an example of a filtering process. For this illustrative example, a 3×3 pixel filter is described. It is noted that any size filter may be utilized. Moreover, the pixel filter may perform simple averaging or be constructed of a more complex filter kernel. Notwithstanding the size or complexity of the filter, a description of a simple 3×3 pixel filter example will provide a demonstration of the principles of operation of this filter.

In FIG. 7, a portion of an image 701, in the form of a matrix, is shown. In the portion of the image 701, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 701. A filter kernel 702 provides a simple matrix of filter weights wherein an output pixel is the evenly weighted average of the nine pixels covered by the filter kernel 702. After a filter 704 performs the filtering operation, a portion of a output image 703 is generated.

The portion of the output image 703, as illustrated in FIG. 7, demonstrates that the original sharp edge of the portion of the image 701 has been smeared. More specifically, the original edge of the portion of the image 701 made the transition from "1" to "0" in a width of a single pixel. On the other hand, the filtered edge of the portion of the output image 703 now covers a width of three pixels.

In other words, when the pixel A of the portion of the image 701 of FIG. 7 is processed by the filter 704, the output pixel A' of the portion of the output image 703 has a value of zero indicating, in this example, a white region, assuming that the column to the right of the rightmost illustrated column contained only "0" values. It is noted that the pixel of interest has a filter position that is associated with the highlighted pixel position F.

Moreover, when the pixel B of the portion of the image 701 is processed by the filter 704, the output pixel B' of the portion of the output image 703 has a value of "⅓" indicating, in this example, a grey region. Furthermore, when the pixel C of the portion of the image 701 is processed by the filter 704, the output pixel C' of the portion of the output image 703 has a value of "⅔" indicating, in this example, a grey region.

Lastly, as illustrated, when the two columns to the left of the leftmost illustrated column contain only "1" values and the center pixel D of the portion of the image 701 is processed by the filter 704, the resulting output pixel D' of the portion of the output image 703 has a value of "1" indicating, in this example, a black region.

Figure 8:
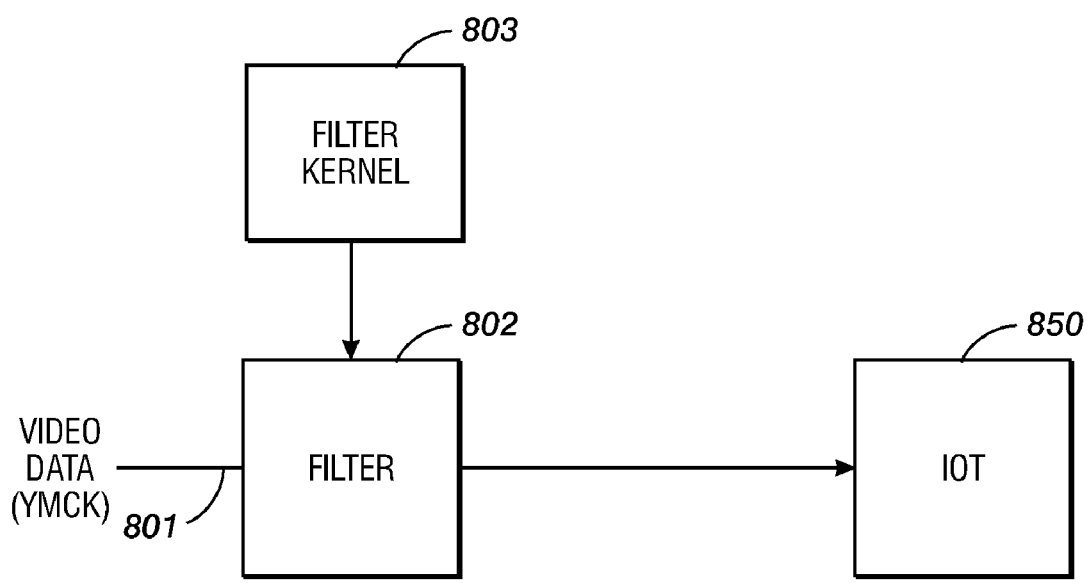
FIG. 8 illustrates a block diagram of a digital filtering process.

FIG. 8 illustrates a block diagram of a conventional device to implement the process illustrated in FIG. 7. As illustrated in FIG. 8, image data 801 is sent to a digital filter module 802, which accepts the image data and filter kernel data 803 and digitally filters to the image data. The output of digital filter module 802 is sent to an image output terminal (IOT) 350, which converts the image data to a hard copy of the image.

However, as noted above, the process of reconstruction will tend to soften edges. An edge is defined as a portion of the original image that has a rapid transition from high to low density or from low to high density. The softening problem may have the tendency of reducing the rapidity of such transitions. The visual effect of such edges is an apparent blur. This distortion is particularly objectionable in those areas of the original where text or line art is present. Text images depend on sharp edges at the edges of the characters to increase the ability of the reader to quickly distinguish different letter shapes.

Figure 9:
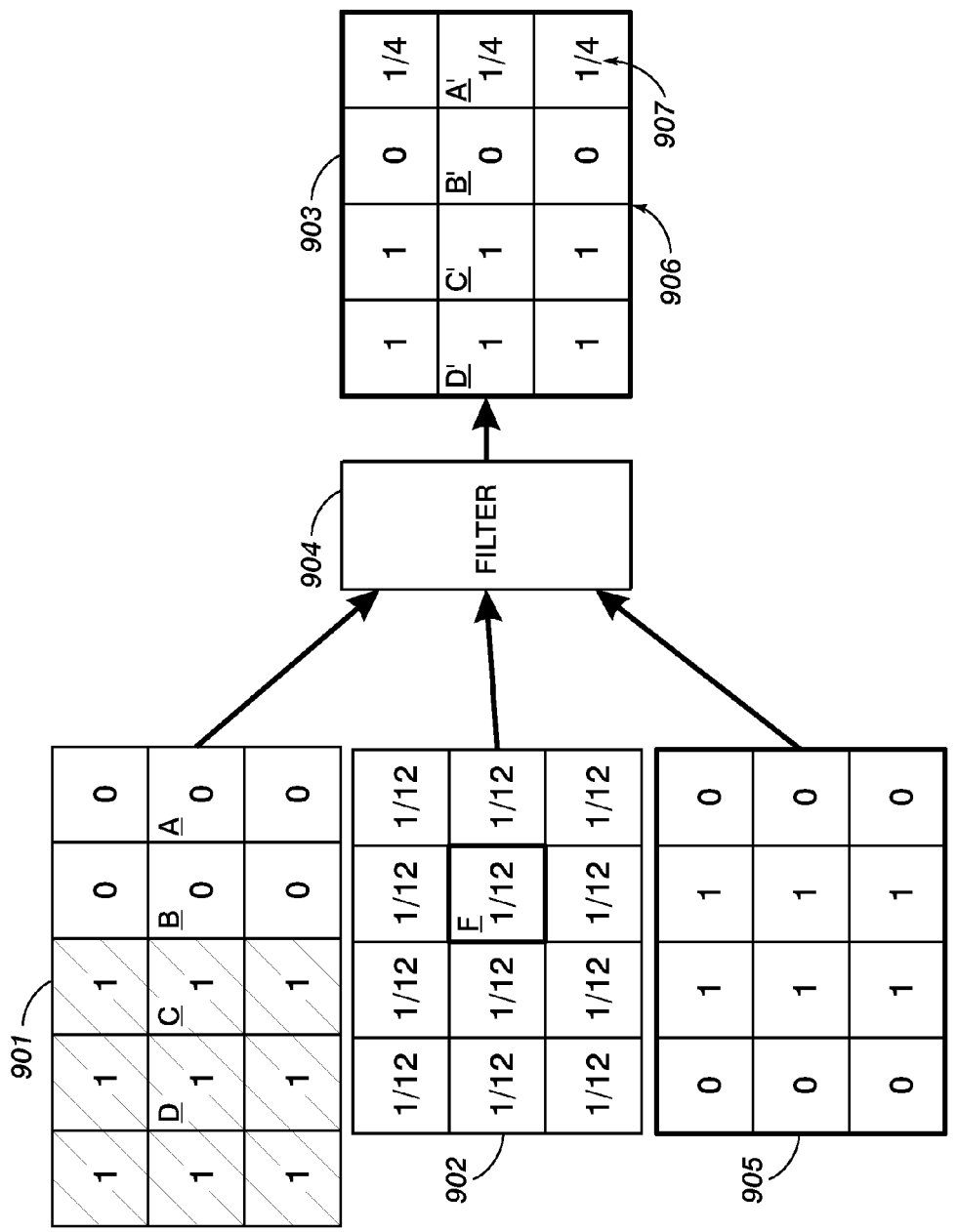
FIG. 9 illustrates a graphical representation of another modified digital filtering reconstruction that uses tag data to identify edges.

As noted above, the blurring of the output edge can be resolved through the use of tag data in conjunction with the image data. More specifically, if the pixel in question within the binary image is matched with a tag bit that indicates that it is an edge pixel, the filter is not applied to that pixel, but an analog level corresponding to high or low density, as the binary image bit is one or zero is output instead. FIG. 9 provides an illustration of this tag data integrated process.

In FIG. 9, a portion of an image 901, in the form of a matrix, is illustrated. In the portion of the image 901, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 901. A filter kernel 902 provides a simple matrix of filter weights wherein an output pixel is the evenly weighted average of the nine pixels covered by the filter kernel 902. Tag data is provided by tag matrix 905 wherein the tag data identifies the pixel as an edge "1" or non-edge "0." After a filter 904 performs the filtering operation using the image data 901, filter weights from filter kernel 902, and tag data from tag matrix 905, a portion of a output image 903 is generated.

The portion of the output image 903, as illustrated in FIG. 9, demonstrates that the original sharp edge of the portion of the image 901 has been converted to a sharp edge 906 with a ghost image artifact 907. More specifically, the original edge of the portion of the image 901 made the transition from "1" to "0" in a width of a single pixel. On the other hand, the filtered edge 906 of the portion of the output image 903 has a transition 906 from "1" to "0" being a width of a single pixel and a ghost artifact 907.

In other words, when the pixel A of the portion of the image 901 of FIG. 9 is processed by the filter 904, the output pixel A' of the portion of the output image 903 has a value of "¼" indicating, in this example, a ghost artifact 907, assuming that the column to the right of the rightmost illustrated column contained only "0" values. It is noted that the pixel of interest has a filter position that is associated with the highlighted pixel position F.

Since pixel A of the portion of the image 901 had not been tagged as an edge by tag matrix 905, the filter value for the pixel A of the portion of the image 901 is selected as the output value for output pixel A' of the portion of the output image 903. This selection of the filter value means that the output value includes the residual filter values, thereby creating the ghost artifact 907.

Moreover, when the pixel B of the portion of the image 901 is processed by the filter 904, the output pixel B' of the portion of the output image 903 has a value of "0" indicating, in this example, a white region because pixel B of the portion of the image 901 had been tagged as an edge by tag matrix 905, and thus, the filter value for the pixel B of the portion of the image 901 is not selected as the output value for output pixel B' of the portion of the output image 903, but the actual value of pixel B of the portion of the image 901 is passed through as the output pixel B' of the portion of the output image 903.

Furthermore, when the pixel C of the portion of the image 901 is processed by the filter 904, the output pixel C' of the portion of the output image 903 has a value of "1" indicating, in this example, a black region because pixel C of the portion of the image 901 had been tagged as an edge by tag matrix 905, and thus, the filter value for the pixel C of the portion of the image 901 is not selected as the output value for output pixel C' of the portion of the output image 903, but the actual value of pixel C of the portion of the image 901 is passed through as the output pixel C' of the portion of the output image 903.

Lastly, when the two columns to the left of the leftmost illustrated column contain only "1" values and the center pixel D of the portion of the image 901 is processed by the filter 904, the resulting output pixel D' of the portion of the output image 903 has a value of "1" indicating, in this example, a black region because pixel D of the portion of the image 901 had not been tagged as an edge by tag matrix 905, and thus, the filter value for the pixel D of the portion of the image 901 is selected as the output value for output pixel D' of the portion of the output image 903.

Figure 10:
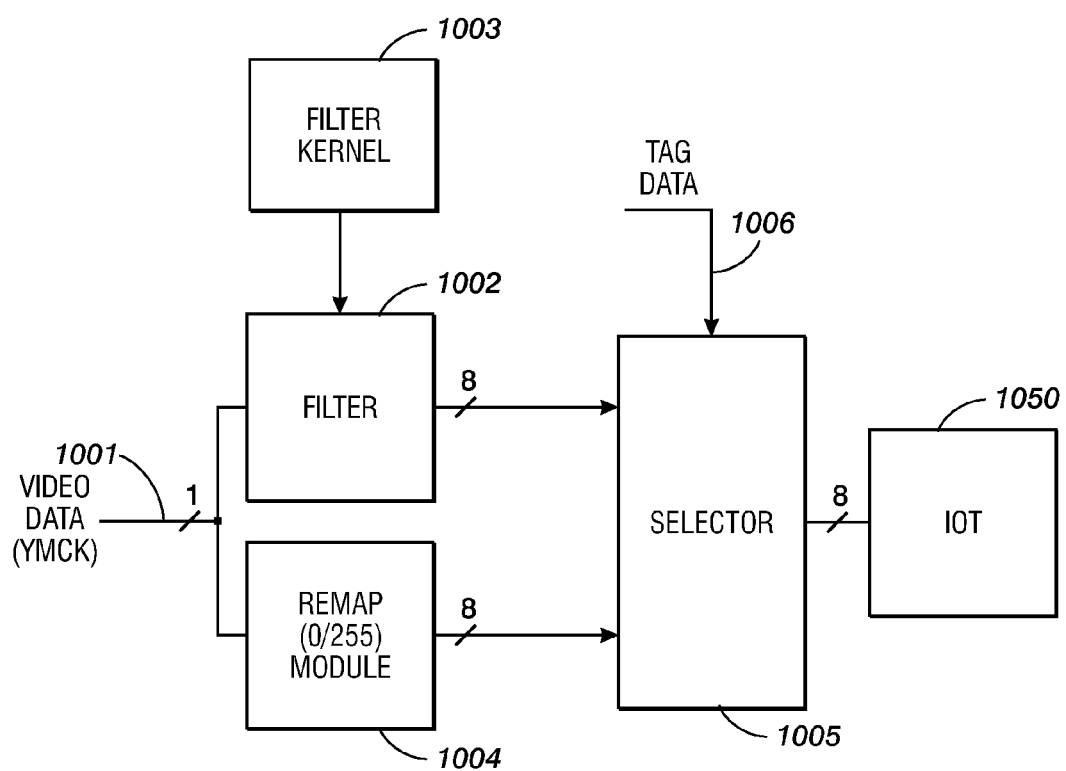
FIG. 10 illustrates a block diagram of another digital filtering process that uses tag data.

FIG. 10 illustrates a block diagram of an implementation of the process illustrated in FIG. 9. As illustrated in FIG. 10, image data 1001 is sent to two modules. The first module, a digital filter module 1002, accepts the image data and filters kernel data 1003 and digitally filters the image data. The second module, a "255/0" module 1004, outputs either 255 (all 8 bits ON) or 0 (all 8 bits OFF) depending on whether the input pixel has a value of "1" or "0." The output of these two modules is sent to a selector module 1005. The output of the selector module 1005, which is controlled by the tag data stream 1006, is sent to an image output terminal (IOT) 5100, which converts the image data to a hard copy of the image. If the tag bit is "1," the selector output is identical to the "255/0" module 1004, and if the tag bit is "0," the selector output is identical to the output of the digital filter module 1002.

If such is a filter is applied, the resulting output is an analog reconstruction of the original image. If the binary representation is of high enough resolution, the analog image is a close reproduction of the original image and there will be few or no visible artifacts.

Figure 11:
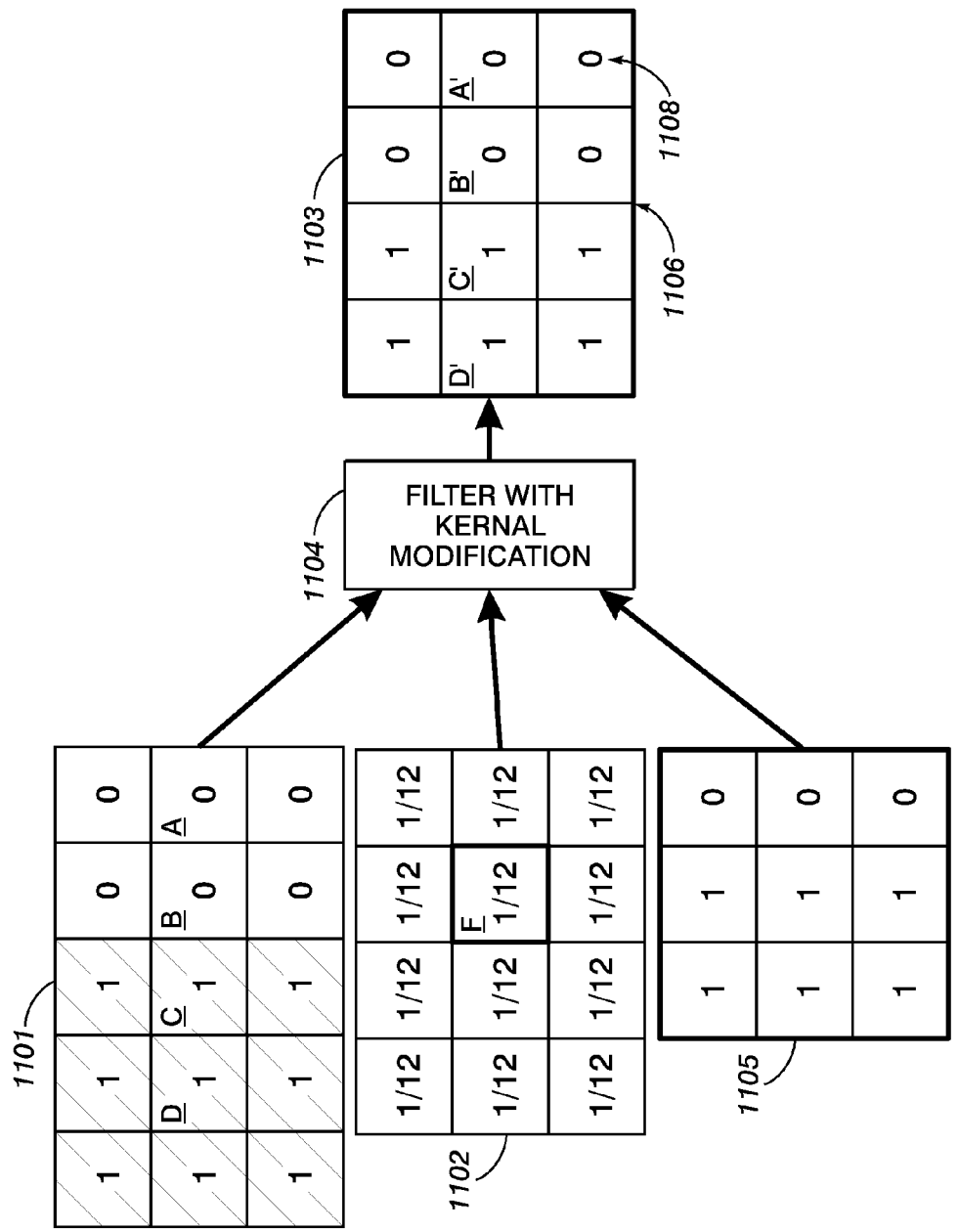
FIG. 11 illustrates a graphical representation of a digital filtering process that eliminates edge artifacts.

FIG. 11 schematically illustrates a process to eliminate the "ghost" artifact generated at pixel position A' in FIG. 4. More specifically, in FIG. 11, a portion of an image 1101, in the form of a matrix, is shown. In the portion of the image 1101, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 1101. A filter kernel 1102 provide a simple matrix of filter weights wherein an output pixel is the evenly weighted average of the nine pixels covered by the filter kernel 1102. After a filter 1104 performs the filtering operation, a portion of a output image 1103 is generated.

The portion of the output image 1103, as illustrated in FIG. 6, demonstrates that the original sharp edge of the portion of the image 1101 has been converted to a sharp edge 1106 with no ghost image artifact 1108. More specifically, the original edge of the portion of the image 1101 made the transition from "1" to "0" in a width of a single pixel. On the other hand, the filtered edge 1106 of the portion of the output image 1103 has a transition 1106 from "1" to "0" being a width of a single pixel and no ghost artifact 1108.

In other words, when the pixel A of the portion of the image 1101 of FIG. 6 is processed by the filter 1104, the output pixel A' of the portion of the output image 1103 has a value of "0" indicating, in this example, no ghost artifact 1108, assuming that the column to the right of the rightmost illustrated column contained only "0" values. It is noted that the pixel of interest has a filter position that is associated with the highlighted pixel position F.

The output value of output pixel A' of the portion of the output image 1103 has a value of "0" because the pixels associated with the column of the portion of the image 1101 associated with the pixel C of the portion of the image 1101 were tagged as being edge pixels. Due to the pixels being tagged as edge pixels, the values associated with the pixels are not included in the filtering process. The filtering process is utilized because the pixel in question, the pixel A of the portion of the image 1101, is not tagged as an edge. But since the filtering process would normally process edge associated pixels, the particular edge pixel values are individually excluded from the filtering process.

Moreover, when the pixel B of the portion of the image 1101 is processed by the filter 1104, the output pixel B' of the portion of the output image 1103 has a value of "0" indicating, in this example, a white region because pixel B of the portion of the image 1101 had been tagged as an edge, and thus, the filter value for the pixel B of the portion of the image 1101 is not selected as the output value for output pixel B' of the portion of the output image 1103, but the actual value of pixel B of the portion of the image 1101 is passed through as the output pixel B' of the portion of the output image 1103.

Furthermore, when the pixel C of the portion of the image 1101 is processed by the filter 1104, the output pixel C' of the portion of the output image 1103 has a value of "1" indicating, in this example, a black region because pixel C of the portion of the image 1101 had been tagged as an edge, and thus, the filter value for the pixel C of the portion of the image 1101 is not selected as the output value for output pixel C' of the portion of the output image 1103, but the actual value of pixel C of the portion of the image 1101 is passed through as the output pixel C' of the portion of the output image 1103.

Lastly, when the two columns to the left of the leftmost illustrated column contain only "1" values and the center pixel D of the portion of the image 1101 is processed by the filter 1104, the resulting output pixel D' of the portion of the output image 1103 has a value of "1" indicating, in this example, a black region because pixel D of the portion of the image 1101 had not been tagged as an edge, and thus, the filter value for the pixel D of the portion of the image 1101 is selected as the output value for output pixel D' of the portion of the output image 1103.

Figure 12:
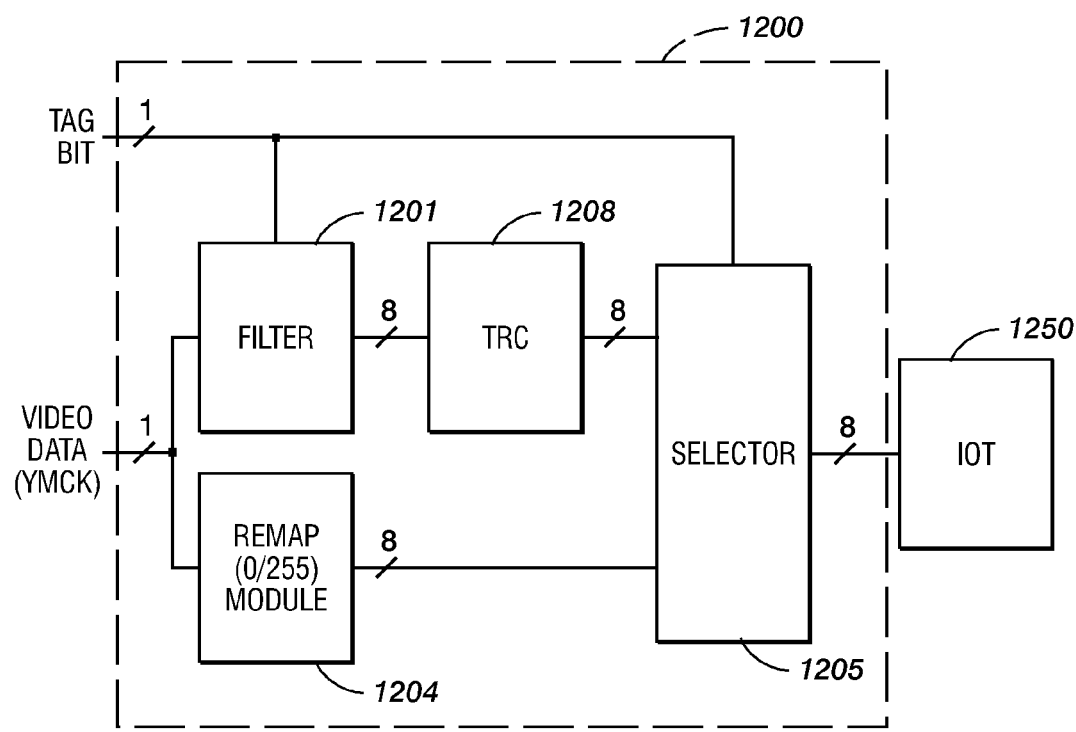
FIG. 12 illustrates a block diagram of a system utilizing the process of FIG. 6 and incorporating a tonal reproduction curve module.

FIG. 12 shows a block diagram of a device to implement the process illustrated in FIG. 11. As illustrated in FIG. 12, image data is sent to two modules. The first module, a digital filter module 1201 accepts the image and tag data and digitally filters the image data. The second module, a Remap "255/0" module 1204, outputs either 255 (all 8 bits ON) or 0 (all 8 bits OFF) depending on whether the input pixel has a value of "1" or "0." The output of these two modules is sent to a selector module 1205. The output of the selector module 1205, which is controlled by the tag data stream, is sent to an image output terminal (IOT) 1250, which converts the image data to a hard copy of the image. If the tag bit is 1, the selector output is identical to the Remap "255/0" module 1204, and if the tag bit is 0, the selector output is identical to the output of the digital filter module 1201.

While the elements of FIG. 11 are essentially the same as in FIG. 9, the digital filter module 1201 is modified to include an input from the tag data stream as well as the image stream. The filtering process of FIG. 12 requires that any edge pixel inside of the filter window is not included in the averaging process. By doing so, the edge pixels that are near the pixel under consideration are excluded from the averaging process. This essentially eliminates the edge artifacts from the reconstructed image.

The implementation of FIG. 12 can be described by the following logical equation:

$$t_x = \sum_i \sum_j x_{ij} * f_{ij} * w'_{ij}$$

where the $t_x$, $x_{ij}$ and $f_{ij}$ are as before, but $w'_{ij}$ is a weight value determined by the tag matrix.

If pixel ij in the tag matrix is 1, indicating that the pixel is an edge pixel, $w_{ij}$ is zero and the corresponding pixel in the binary image is not included in the output summation. In a different embodiment, if pixel ij in the tag matrix is 1, indicating that the pixel is an edge pixel, $w_{ij}$ is zero and the other weight coefficients may be modified to ensure that the remaining non-zero coefficients, when summed, equal a predetermined filter kernel matrix value. In a further embodiment, if pixel ij in the tag matrix is 1, indicating that the pixel is an edge pixel, $w_{ij}$ is zero and the other weight coefficients may be modified to ensure that the remaining non-zero coefficients, when summed, equal a predetermined filter kernel matrix value of one. In these further embodiments, the coefficients or weights of the filter kernel associated with the remaining non-zero coefficients or weights are further modified to normalize the filter kernel matrix value.

As noted above, several additional features may be added to this system as alternatives. For example, the digital filter kernel is usually implemented so that the sum of the weights or coefficients in the filter matrix is normalized to 1. It is noted that the process may choose to re-normalize the filter matrix on the fly to take into account those weights or coefficients that are not used because the weights or coefficients coincide with tagged pixels. A way to implement this is to add an additional element to the module of FIG. 9.

FIG. 12 further shows a tonal reproduction curve circuit 1208, which performs a tonal reproduction curve operation on the output of the digital filter 1201. This tonal reproduction curve ("TRC") circuit 1208 performs a simple table lookup operation to transform the output of the digital filter 1201 to a new set of values that are consistent with the filter operation. It may consist of a plurality of tables that are selected by a signal from the digital filter 1201. The signal may be computed by the digital filter 1201 as a function of the number of filter elements that are eliminated by ignoring tagged pixels. The signal may also be based on the number of eliminated pixels, or by a more complex computation that renormalizes the filter kernel based on the weights or coefficients of the pixels that are not counted.

The TRC circuit may also function as a normal TRC circuit in that the tonal reproduction curve may be based on factors that are independent of the filter operations. For example, the tonal reproduction curve could compensate for the response of the image output terminal or print engine. The tonal reproduction curve could be calculated based on the image content and a desire to normalize the tone response curve of the system. Finally, the tonal reproduction curve can also be altered in response to user input, for example, to change the contrast or lightness/darkness of the output image. Of course, any of these tonal reproduction curves can be concatenated with a tonal reproduction curve to compensate for the filtering operations to give a single tonal reproduction curve that accomplishes all of these goals.

As noted above, the tag bit can be used to determine whether to apply the filter or not, but the tag bit can also be used for each individual pixel location to determine whether to use that pixel in the sum of the filtered pixels. This has the effect of eliminating ghosting around text on the output image.

The following is a brief written explanation of using the tag bit as part of the filtering operation to determine whether to include the individual pixels in the filtered total. Although the filtering process is typically a 2-dimensional process, this written explanation utilizes a 1-dimensional example for simplicity. In this example, the process is a binary data extended to contone process In this written example, the binary data extended to contone process is a filtering process utilizing a standard convolution operation upon an input pixel value P(0,3) to realize an output pixel value P'(0,3). As noted above, with respect to the conventional process, if the pixel P(0,3) is not tagged, namely T(0,3) is equal to zero, the output pixel value for P'(0,3) is the summation of the products $(P_{ij})(F_{ij})$. On the other hand, if the pixel P(0,3) is tagged, namely T(0,3) is equal to one, the output pixel value for P'(0,3) is equal to P(0,3).

With respect to a binary data extended to contone process that eliminates ghost artifacts, one embodiment may operate as follows.

If the pixel P(0,3) is not tagged, namely T(0,3) is equal to zero, the output pixel value for P'(0,3) is the summation of the products $(P_{ij})(F_{ij})$ wherein $(P_{ij})(F_{ij})$ is only calculated when the value of T(i,j) equals zero. If the value of T(i,j) equals one, $(P_{ij})(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

With respect to a binary data extended to contone process that eliminates ghost artifacts, another embodiment, utilizing the illustration of FIG. 14, may operate as follows.

If the pixel P(0,3) is not tagged, namely T(0,3) is equal to zero, the output pixel value for P'(0,3) is the summation of the components of $(F_{ij})$ when both the value of T(i,j) equals zero and the value of P(i,j) is equal to one. If the value of T(i,j) equals one or the value of P(i,j) is not equal to one, $(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

Figure 13:
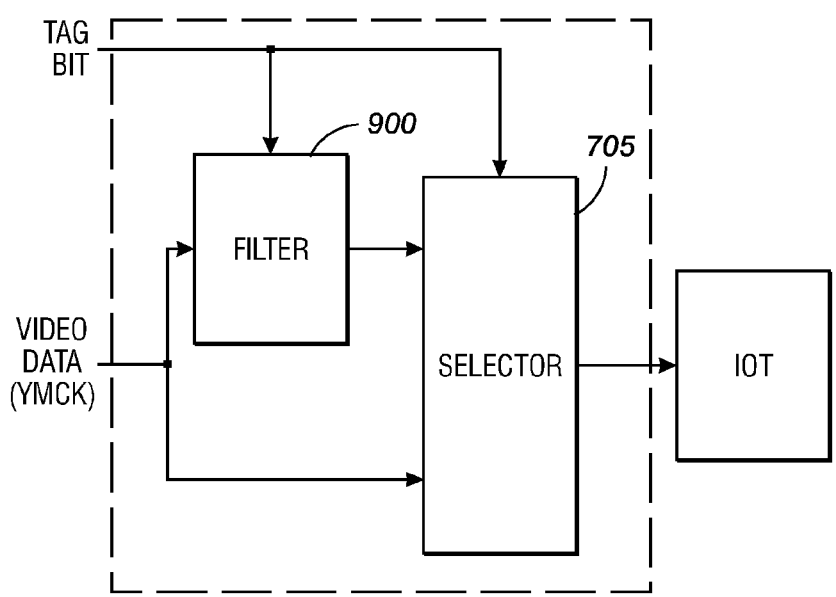
FIG. 13 illustrates a block diagram of a system utilizing a digital filtering process that eliminates edge artifacts.

FIG. 13 illustrates a system for converting edge-tagged pixels of image data to pixels of contone image data. As illustrated in FIG. 13, a filter 900 receives both image data and the tag bits. The filter 900 determine a tagged state value of each pixel of image data within a predefined neighborhood of pixels wherein each pixel of image data within the predefined neighborhood of pixels has an associated image value and a first pixel of image data within the predefined neighborhood of pixels is associated a first pixel of contone image data.

The filter 900 filters, using a predetermined set of filter weighting values wherein each pixel of image data within the predefined neighborhood of pixels has an associated filter weighting value, each image value of each pixel of image data within the predefined neighborhood of pixels having a tagged state value indicating that the pixel of image data is a non-edge pixel to generate a filtered image value for each pixel of image data within the predefined neighborhood of pixels having a tagged state value indicating that the pixel of image data is a non-edge pixel; assigns, a predetermined filtered image value to each pixel of image data within the predefined neighborhood of pixels having a tagged state value indicating that the pixel of image data is an edge pixel;

and sums all filtered image values for the predefined neighborhood of pixels to produce an image data sum value.

Based on the tag value for the first pixel of image data within the predefined neighborhood of pixels, a selector 705 either allows, when the tagged state value of the first pixel of image data indicates the first pixel of image data is a non-edge pixel, the image data sum value to be assigned as an image data value for the first pixel of contone image data or the image data value of the first pixel of image data to be assigned as an image data value for the first pixel of contone image data. It is noted that the predetermined filtered image value may be zero. This process can be utilized when each pixel of image data within the predefined neighborhood of pixels has an associated binary image value.

Figure 14:
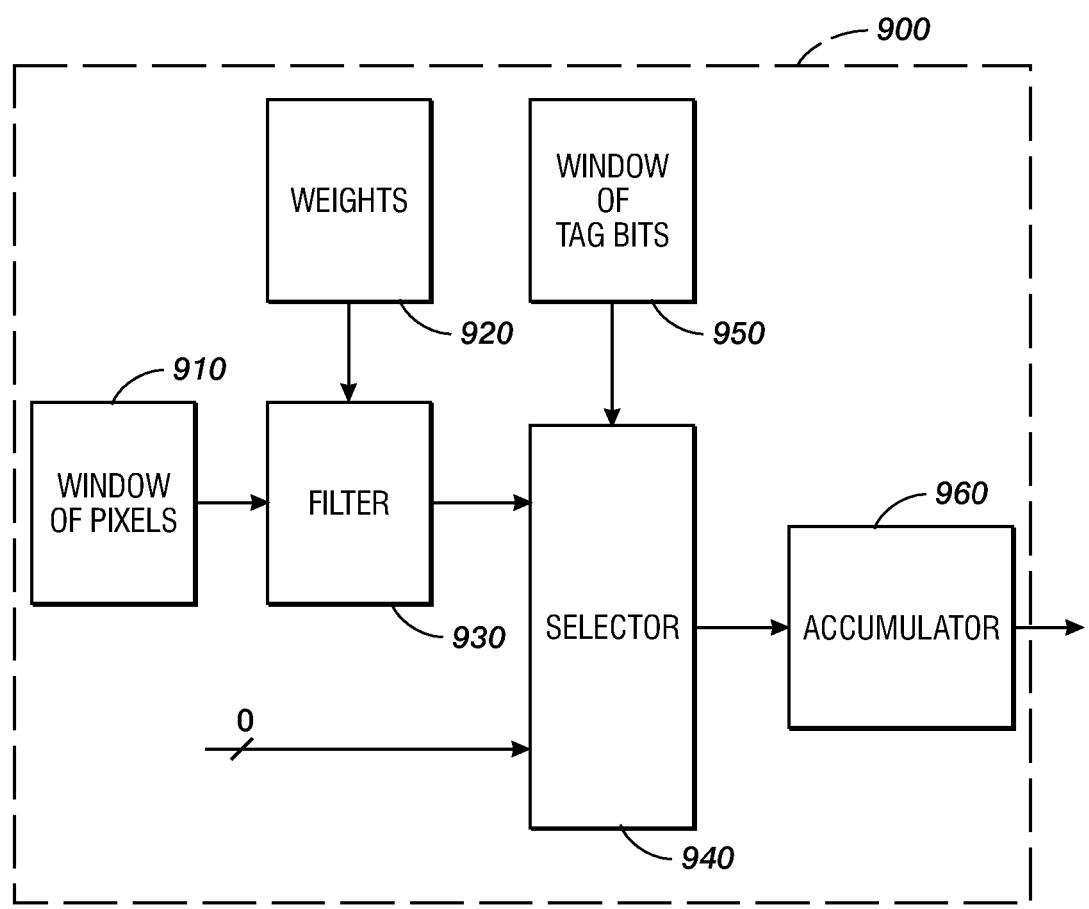
FIG. 14 illustrates a block diagram of a system utilizing a digital filtering process that eliminates edge artifacts.

FIG. 14 illustrates a filter circuit configuration that enables the converting of edge-tagged pixels of image data to pixels of contone image data. As illustrated in FIG. 14, a filter 900 includes a buffer 910 for storing a window of pixels. This window of pixels may be a two-dimensional matrix of image data. The image data within the buffer 910 is fed to a filter 930. The filter 930 also receives filter weights values from a filter weights buffer or memory 920.

Upon receiving the image data and the filter weights, the filter 930 multiplies each image data value with the associated filter weight value. The product is received by selector 940. Selector 940 selects between the product from filter 930 and a zero value based upon tag bit data received from a tag bit buffer or memory 950. More specifically, when the pixel associated with the product is tagged as a non-edge pixel, the selector 940 selects the product from filter 930. When the pixel associated with the product is tagged as an edge pixel, the selector 940 selects the zero value. The selected value is received by accumulator 960 which generates the non-edge image data value for the contone image.

Figure 15:
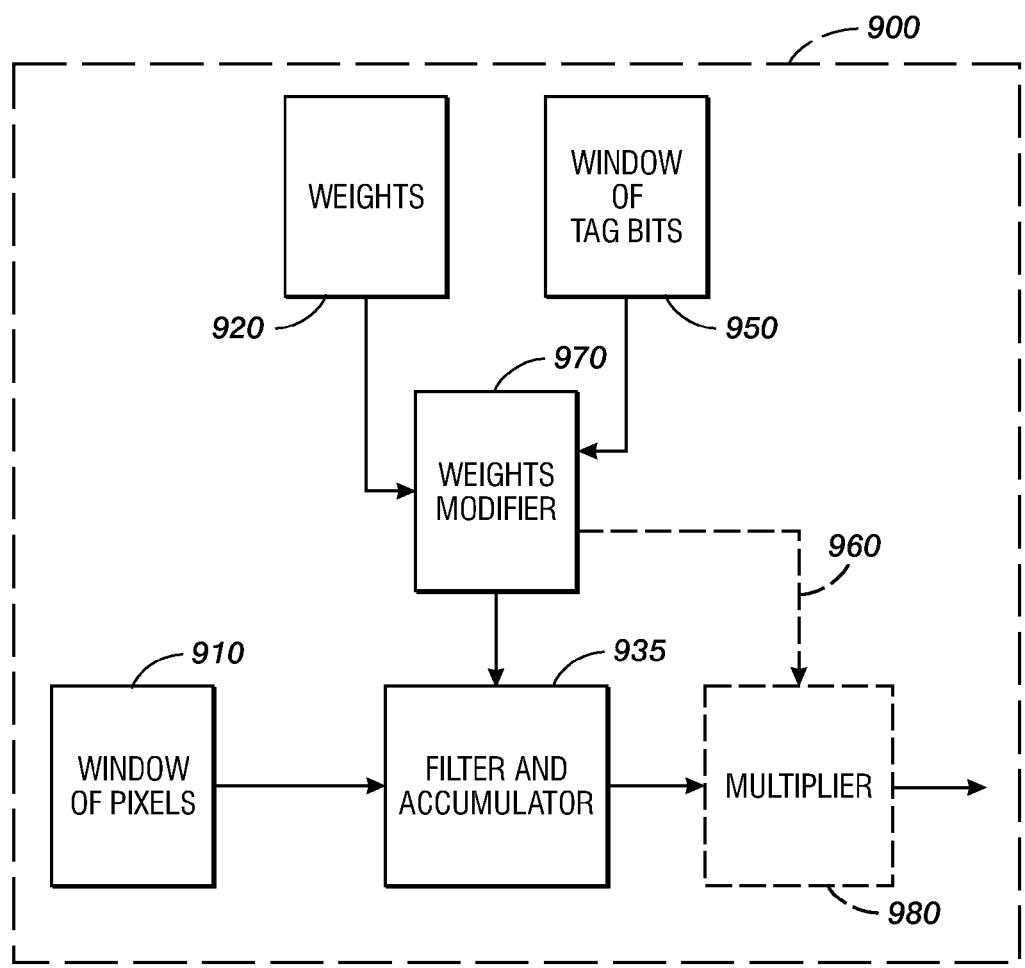
FIG. 15 illustrates a block diagram of a system utilizing a digital filtering process that eliminates edge artifacts.

FIG. 15 illustrates another filter circuit configuration that enables the converting of edge-tagged pixels of image data to pixels of contone image data. As illustrated in FIG. 15, a filter 900 includes a buffer 910 for storing a window of pixels. This window of pixels may be a two-dimensional matrix of image data. The image data within the buffer 910 is fed to a filter & accumulator 935. The filter & accumulator 935 also receives filter weights values from a filter weights modifier circuit 970.

Upon receiving the image data and the filter weights, the filter & accumulator 935 multiplies each image data value with the associated filter weight value. The product is the generated non-edge image data value for the contone image.

As further illustrated in FIG. 15, the filter weights modifier circuit 970 receives filter weights values from a filter weights buffer or memory 920 and tag bit data from a tag bit buffer or memory 950. The filter weights modifier circuit 970 utilizes this data, in a variety of ways to create a matrix of modified filter weight values to be utilized by the filter & accumulator 935.

For example, the filter weights modifier circuit 970 determines a tagged state value of each pixel of image data within a predefined neighborhood of pixels and a number, N, pixels of image data within the predefined neighborhood of pixels having a tagged state value indicating that the pixel of image data is a non-edge pixel. In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

In another example, the filter weights modifier circuit 970 determines a tagged state value of each pixel of image data within a predefined neighborhood of pixels and a sum, S, of all filter weighting values within the predetermined set of filter weighting values associated with pixels of image data within the predefined neighborhood of pixels having a tagged state value indicating that the pixel of image data is a non-edge pixel.

In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

Another alternative for modifying the filter weights is to use the sum of the filter weights of either the excluded pixels, or of only the included pixels, and using this value as the entry into a lookup table whose output can be a factor by which to multiply the remaining, non-excluded filter, weights, the filter weights associated with pixels having a tag value indicating a non-edge. This can be applied internally to the filter weights in element 970 of FIG. 15, or alternatively, the weight can be output, as signal 960, from the weights modifier element 970 and applied as an input to a multiplier element 980 where it multiplies the output of the digital filter.

More specifically, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

On the other hand, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

Furthermore, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 may apply the sum as an input to a lookup table, and a multiplier may be used to multiply the image data sum value by an output value from the lookup table, corresponding to inputted sum to modify the image data sum value.

Lastly, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 may apply the sum as an input to a lookup table, and a multiplier may be used to multiply the image data sum value by an output value from the lookup table, corresponding to inputted sum to modify the image data sum value.

If the print data can be encoded with a tag image, the data from the print side will be processed by the same resolution conversion module in the image path and the print and copy/scan parts of the machine. Furthermore, the print and copy image quality will be similar which is a desirable effect.

In most page description language conversion software, the user's ability to specify the halftoning capabilities is limited. In many cases, the user can specify the bit depth, the number of bits per pixel in the image, and may also be able to specify the details of the halftone matrix to be used. However, while most page description language conversion software allows the generation of contone images, none of the normal channels allow the generation of a tag image plane in parallel with a binary image plane.

Notwithstanding, some of the software that converts the page description language to print data provides for an alternative interface to the program that allows the user of the program to add program code to implement a custom halftone procedure. In simple form, such a halftone interface passes a contone image plane to the user developed code and receives back a halftoned image. All that is needed is to provide, via the halftone interface, a code module that accepts contone image and generates both a binary image and a tag image plane, preferably to combine the image and tag data into a single image plane with two bits per pixel.

Figure 16:
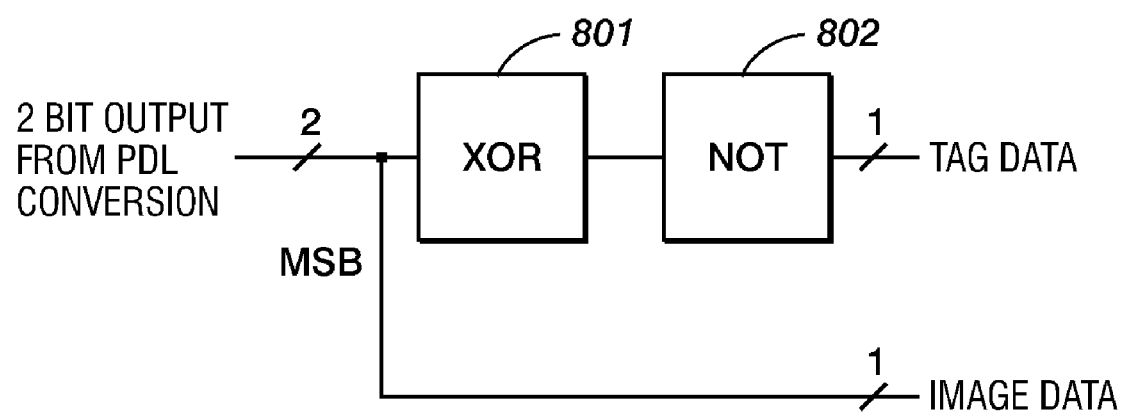
FIG. 16 illustrates a circuit to separate an encoded image into image and tag planes.

If the output from this software is a single image plane with two bits per pixel, combining the image and tag data, FIG. 16 illustrates an example of a circuit that separates the two bit per pixel image back into two separate planes. More specifically, FIG. 16 illustrates a simple circuit to implement the separation of the image data stream and the tag data stream from the two bit combined output of the page description language to print conversion. In the circuit, the two bit per pixel data stream that is output from the page description language to print conversion stage is passed through a XOR circuit 801 and inverted in a NOT gate 802 whose output is the tag data stream. In parallel, the high order (MSB) bit is separated and passed as the image data.

Thus, the high order bit of the two bit output represents the image value. As noted above, the tag bit can be recovered by doing a NXOR (an inverted XOR) operation on the two bits. In this case, if the output of the tag extraction circuit (801 and 802) is non-edge data, the output is defined as "0." On the other hand, if the output of the tag extraction circuit (801 and 802) is edge data, the output is defined as "1."

This separation can be done either in software or preferably in a simple hardware set of gates in the element of the image path that receives the two bit per pixel image from the print generation element.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing images in a digital printer, comprising:
   (a) receiving an electronic image file, the electronic image file including at least one object representing a contone image and at least one object representing a non-contone image;
   (b) processing the contone image object to generate an edge tagged encoded binary image data stream;
   (c) processing the non-contone image object to generate an encoded binary data stream;
   (d) applying a first binary to contone conversion process to the encoded binary data stream to generate a first contone image stream; and
   (e) applying a second binary to contone conversion process to the edge tagged encoded binary image data stream to generate a second contone image stream; and
   (f) combining the first contone image stream and the second contone image stream to form a single contone page image stream for rendering by a digital printer.

2. The method as claimed in claim 1, wherein the processing of the contone image object includes converting the image data of the contone image to a three color luminance-chrominance space.

3. The method as claimed in claim 2, wherein the three color luminance-chrominance space is the YCC color space.

4. The method as claimed in claim 2, wherein the three color luminance-chrominance space is the L*a*b* color space.

5. The method as claimed in claim 2, wherein the three color luminance-chrominance space is the RGB color space.

6. The method as claimed in claim 2, wherein the three color luminance-chrominance space is the HSV color space.

7. The method as claimed in claim 1, wherein the second binary to contone conversion process preserves edge sharpness.

8. A system for processing an electronic image file in a digital printer, the electronic image file including at least one object representing a contone image and at least one object representing a non-contone image, comprising:
   a processor to process the contone image object to generate an edge tagged encoded binary image data stream and to process the non-contone image object to generate an encoded binary data stream;

said processor applying a first binary to contone conversion process to the encoded binary data stream to generate a first contone image stream and applying a second binary to contone conversion process to the edge tagged encoded binary image data stream to generate a second contone image stream;

said processor combining the first contone image stream and the second contone image stream to form a single contone page image stream for rendering by a digital printer.

9. The system as claimed in claim 8, wherein said processor converts the image data of the contone image to a three color luminance-chrominance space.

10. The system as claimed in claim 9, wherein the three color luminance-chrominance space is the YCC color space.

11. The system as claimed in claim 9, wherein the three color luminance-chrominance space is the L*a*b* color space.

12. The system as claimed in claim 9, wherein the three color luminance-chrominance space is the RGB color space.

13. The system as claimed in claim 9, wherein the three color luminance-chrominance space is the HSV color space.

14. The system as claimed in claim 8, wherein said second binary to contone conversion process preserves edge sharpness.

* * * * *